3,312,738
DIBENZOCYCLOHEPTENES AND PROCESSES FOR THE PREPARATION THEREOF
Max Tishler, Westfield, John M. Chemerda, Metuchen, and Janos Kollonitsch, Westfield, N.J., assignors to Merck & Co., Inc., Rahway, N.J., a corporation of New Jersey
No Drawing. Filed July 3, 1962, Ser. No. 207,406
5 Claims. (Cl. 260—556)

This invention relates to a process for the production of 5H-dibenzo[a,d]cycloheptenes. In particular, the invention relates to the preparation of 5H-dibenzo[a,d]-cycloheptenes which are substituted at the 5-position with a secondary aminopropyl. More particularly, the invention is concerned with the preparation of 5-(3-methyl-aminopropyl)-5H-dibenzo[a,d]cycloheptene. The invention also relates to novel compounds utilized in the process and their preparation.

In accordance with the process of the present invention, an alkali metal derivative of 5H-dibenzo[a,d]cycloheptene is reacted with an N-(3-halopropyl)-N-methyl-hydrocarbonsulfonamide and the resulting 5-[3-(N-hydrocarbonsulfonyl-N-methyl) - aminopropyl]-5H-dibenzo[a,d]-cycloheptene transformed into the desired product. This process may be illustrated as follows:

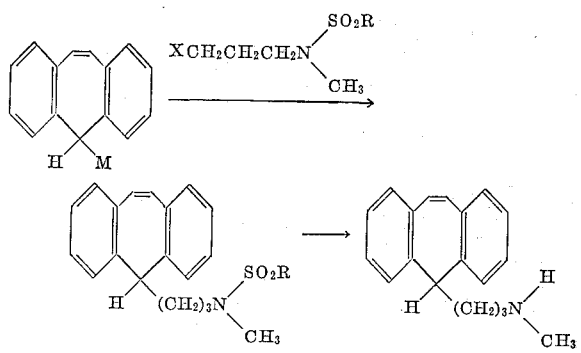

wherein M represents an alkali metal such as sodium, potassium or lithium; R is a radical selected from the group consisting of alkyl, cycloalkyl, aralkyl and aryl and X is a halogen, preferably chlorine or bromine. The compounds may also have substituents on one or both of the benzenoid rings and/or on the propyl chain. It will be readily apparent to those skilled in the art that inasmuch as the R group is removed during the process, it is not critical which particular group is utilized to form the N - (3-halopropyl)-N-methylhydrocarbonsulfonamide or intermediate dibenzocycloheptene and the choice thereof is subject only to the limitations of ease of splitting of the sulfonamide intermediate and other practical and economical considerations. However, the preferred groups in each instance are alkyl or aryl.

The starting compound, namely, the alkali metal derivative of 5H-dibenzo[a,d]cycloheptene may be readily prepared by reacting 5H-dibenzo[a,d]cycloheptene with a metalating reagent such as, for example, sodium amide, potassium amide, phenylsodium, butyllithium and the like. The sodium and potassium derivatives may be prepared using the process described by Villani, J. Med. and Pharm. Chem. 5, pp. 373–382 (1962). The lithium derivative may be prepared in analogous manner using butyllithium.

The N - (3-halopropyl)-N-methylhydrocarbonsulfonamides may be prepared by reacting a 1-halo-3-halopropane with an alkali metal salt of an N-methylhydrocarbonsulfonamide. This may be illustrated as follows:

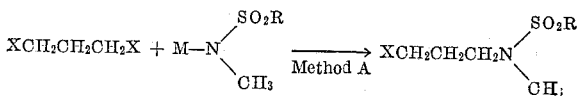

wherein X, M and R are as previously defined. In the case of the dihalopropane reactant, the X substituents may be the same or different. However, as pointed out hereinabove, although R is preferably an alkyl or aryl radical, it is not critical which particular group is utilized to form the sulfonamide reactant since this group is subsequently removed during the process. The reaction is suitably carried out in the presence of an inert, substantially anhydrous organic medium which is suitable as a solvent for the sulfonamide salt. Representative solvents include formamide, dimethylformamide, dimethylacetamide and dimethylsulfoxide. The temperature at which the reaction is carried out is not critical. The reaction may be carried out at room temperature or elevated temperatures up to the reflux temperature of the system. Likewise, the ratio of reactants is not critical and equimolar amounts may be used although it is preferred to employ a slight excess of the sulfonamide salt. After completion of the reaction, the solvent is removed and the desired product recovered. Further purification of the product can be achieved by recrystallization.

An alternate procedure for preparing the above sulfonamides involves reacting a 1-hydrocarbonsulfonyloxy-3-halopropane with an alkali metal salt of an N-methyl-hydrocarbonsulfonamide. This process may be represented as follows:

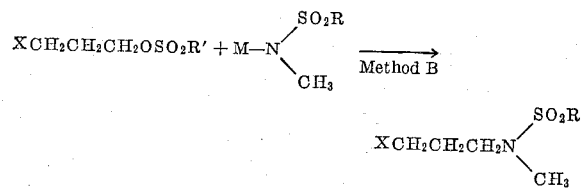

wherein X, M and R are as previously defined. In this procedure, R' is as defined for R, and R and R' may be similar or dissimilar. The reaction conditions are the same as described for Method A.

The 1-hydrocarbonsulfonyloxy-3-halopropanes can be prepared by reacting a 3-halopropanol-1 with a hydrocarbonsulfonyl halide using known methods heretofore described in the literature.

The reaction between the alkali metal derivative of 5H-dibenzo[a,d]cycloheptene and the N-(3-halopropyl)-N-methylhydrocarbonsulfonamide is carried out in an inert, substantially anhydrous organic solvent. The choice of solvent is not critical and a wide variety can be utilized. Representative of these are the aromatic hydrocarbons such as benzene, toluene and the like; aliphatic hydrocarbons such as heptene, hexane and the like; ethers such as diethylether, diamylether and the like. The temperature at which the reaction is carried out is not critical. The reaction may be carried out at room temperature or elevated temperatures up to the reflux temperature of the system. Likewise, the ratio of reactants is not critical and equimolar amounts may be used. After completion of the reaction, the solvent is removed and the 5-[3-(N-hydrocarbonsulfonyl - N - methyl)-aminopropyl]-5H-dibenzo[a,d]cycloheptene recovered. Further purification of the product can be achieved by crystallization.

Conversion to the 5-(3-methylaminopropyl)-5H-dibenzo[a,d]cycloheptene is accomplished employing the conventional methods for the splitting of sulfonamides as, for example, by treatment with hydrobromic acid in acetic acid in the presence of phenol or by reductive splitting with liquid ammonia in the presence of sodium metal.

The end compound, namely, 5-(3-methylaminopropyl)-5H-dibenzo[a,d]cycloheptene, prepared by the process of the present invention, is useful in the treatment of mental health conditions as it is an anti-depressant and serves as a mood elevator or a psychic energizer. For this purpose, the daily dosage is within the range of 5–250 mg., preferably taken in divided amounts over the day.

The following examples are given for purposes of illustrating the present invention and are not to be construed as limiting the invention.

*Example 1.—Preparation of N-(3-chloropropyl)-N-methyl-p-toluenesulfonamide*

To a mixture containing 20.7 g. (0.1 mole) of the sodium salt of N-methyl-p-toluenesulfonamide and 4 g. sodium iodide in 150 ml. of dimethylformamide is added 15.8 g. (0.1 mole) of 1-chloro-3-bromopropane and the mixture heated at 120° C. with stirring for 36 hours. The solvent is distilled off in vacuo and, after the addition of water, the solid product is recovered by filtration.

*Example 2*

Following the procedure of Example 1 and employing equivalent quantities of the sodium salt of N-methyl-benzenesulfonamide, N-methyl-methylsulfonamide and N-methyl-benzylsulfonamide in place of the sodium salt of N-methyl-p-toluenesulfonamide, there is obtained N-(3 - chloropropyl)-N-methyl-benzenesulfonamide, N-(3-chloropropyl)-N-methyl-methylsulfonamide and N-(3-chloropropyl)-N-methyl-benzylsulfonamide.

*Example 3.—Alternate preparation of N-(3-chloropropyl)-N-methyl-p-toluenesulfonamide*

17.2 G. of 3-chloro-1-methylsulfonyloxypropane is added to a mixture containing 20.7 g. (0.1 mole) of the sodium salt of N-methyl-p-toluenesulfonamide in 100 ml. of dimethylformamide and the mixture stirred at 100° C. for 20 hours. The solvent is distilled off in vacuo and 200 ml. of water added to the residue and the product recovered by filtration.

*Example 4*

Following the procedure of Example 3 and employing 3-chloro-1-phenylsulfonyloxypropane, 3-chloro-1-benzylsulfonyloxypropane and 3-chloro-1-p-tolylsulfonyloxypropane in place of 3-chloro-1-methyl-sulfonyloxypropane, there is obtained the same product of Example 3.

*Example 5.—Preparation of 5-[3-(N-methyl-N-p-toluenesulfonyl)-aminopropyl]-5H-dibenzo[a,d]cycloheptene*

To a suspension of 3.9 g. of potassium amide is slowly added a solution of 19.2 g. (0.1 mole) of 5H-dibenzo[a,d]cycloheptene in 600 ml. of ether with stirring. The suspension is refluxed with stirring for 3 hours, then cooled to room temperature and 32.05 g. of N-(3-chloro-propyl)-N-methyl-p-toluenesulfonamide and 5 g. of sodium iodide is added. The ether is distilled off and 200 ml. of diethyleneglycol dimethylether is added and the mixture heated with stirring at 80° C. for 12 hours. The diethyleneglycol dimethylether is evaporated in vacuo and 100 ml. of water and 100 ml. of ether added. The ether layer is then washed with dilute hydrochloric acid, then water and then dried over magnesium sulfate and evaporated to dryness yielding 5-[3-(N-methyl-N-p-toluenesulfonyl)-aminopropyl]-5H-dibenzo[a,d]cycloheptene.

*Example 6*

Following the procedure of Example 5 and employing equivalent quantities of N-(3-chloropropyl)-N-methyl-benzenesulfonamide, N - (3 - chloropropyl)-N-methyl-methylsulfonamide and N-(3-chloropropyl)-N-methyl-benzylsulfonamide in place of N-(3-chloropropyl)-N-methyl-p-toluenesulfonamide, there is obtained 5-[3-(N-benzenesulfonyl - N - methyl)-aminopropyl]-5H-dibenzo[a,d]cycloheptene, 5 - [3-(N-methyl-N-methylsulfonyl)-aminopropyl]-5H-dibenzo[a,d]cycloheptene and 5-[3-(N-benzylsulfonyl - N-methyl)-aminopropyl]-5H-dibenzo[a,d]-cycloheptene, respectively.

*Example 7.—Preparation of 5-(3-methylaminopropyl)-5H-dibenzo[a,d]cycloheptene from 5-[3-(N-methyl-N-p - toluenesulfonyl)-aminopropyl]-5H-dibenzo[a,d]cycloheptene*

4.2 G. of 5-[3-(N-methyl-N-p-toluenesulfonyl)-aminopropyl]-5H-dibenzo[a,d]cycloheptene is added to 150 ml. of liquid ammonia and then 2 g. of sodium metal is added in small pieces while stirring vigorously, and cooling using a water-bath. After 6 hours of stirring, 8 g. of ammonium chloride is added. After the deep blue color which initially forms disappears, cooling is stopped and the ammonia left to evaporate. 50 ml. of water is added and the mixture alkalized with dilute sodium hydroxide solution and the 5-(3-methylaminopropyl)-5H-dibenzo[a,d]cycloheptene extracted with benzene, and the benzene evaporated off. Further purification can be achieved by forming the oxalic acid salt.

*Example 8*

Following the procedure of Example 7 and employing equivalent quantities of 5 - [3 - (N-benzenesulfonyl-N-methyl) - aminopropyl] - 5H-dibenzo[a,d]cycloheptene, 5-[3 - (N - methyl-N-methylsulfonyl)-aminopropyl]-5H-dibenzo[a,d]cycloheptene and 5-[3-(N-benzylsulfonyl-N-methyl) - aminopropyl]-5H-dibenzo[a,d]cycloheptene in place of 5-[3-(N-methyl-N-p-toluenesulfonyl)-aminopropyl]-5H-dibenzo[a,d]cycloheptene, there is similarly obtained 5 - (3-methylaminopropyl)-5H-dibenzo[a,d]cycloheptene.

We claim:
1. 5 - [3 - (N-methyl-N-p-toluenesulfonyl)-aminopropyl]-5H-dibenzo[a,d]cycloheptene.
2. 5 - [3 - (N-hydrocarbonsulfonyl-N-methyl)-aminopropyl]-5H-dibenzo[a,d]cycloheptene wherein the hydrocarbon moiety of said hydrocarbonsulfonyl is tolyl, benzyl, phenyl or methyl.
3. 5 - [3 - (N-hydrocarbonsulfonyl-N-methyl)-aminopropyl]-5H-dibenzo[a,d]cycloheptene, wherein the hydrocarbon moiety of said hydrocarbonsulfonyl group is alkyl, cycloalkyl, aralkyl or aryl containing up to about 7 carbons.
4. 5 - [3 - (N-hydrocarbonsulfonyl-N-methyl)-aminopropyl]-5H-dibenzo[a,d]cycloheptene, wherein the hydrocarbon moiety of said hydrocarbonsulfonyl group is lower alkyl.
5. 5 - [3 - (N-hydrocarbonsulfonyl-N-methyl)-aminopropyl]-5H-dibenzo[a,d]cycloheptene, wherein the hydrocarbon moiety of said hydrocarbonsulfonyl group is aryl or aralkyl containing no more than 7 carbons.

References Cited by the Examiner

UNITED STATES PATENTS

| | | | |
|---|---|---|---|
| 2,475,424 | 7/1949 | Dickey et al. | 260—556 |
| 2,663,732 | 12/1953 | Weissberger | 260—556 |
| 2,794,834 | 6/1957 | Randall et al. | 260—556 |
| 2,985,660 | 5/1961 | Judd et al. | 260—313 |

OTHER REFERENCES

Houben-Weyl, Methoden der Organischen Chemio, 4th ed., Band XI/1, pages 98–100 and 941–947, Georg Thieme Verlag, Stuttgart, Germany (1957).

JOHN D. RANDOLPH, *Primary Examiner.*

IRVING MARCUS, *Examiner.*

WALTER A. MODANCE, E. E. BERG,
*Assistant Examiners.*